United States Patent

Hass et al.

[11] Patent Number: 5,838,992
[45] Date of Patent: Nov. 17, 1998

[54] METHOD OF SPECIFYING MULTIFUNCTIONAL SUBASSEMBLIES IN A COMMUNICATION SYSTEM

[75] Inventors: Karl-Heinz Hass, München; Karl Klug, Miesbach; Hans-Dietrich Von Lindeiner, Friedberg, all of Germany

[73] Assignee: Siemens Aktiengesellschaft, Munich, Germany

[21] Appl. No.: 981,937

[22] PCT Filed: Jun. 26, 1996

[86] PCT No.: PCT/DE96/01131

§ 371 Date: Dec. 30, 1997

§ 102(e) Date: Dec. 30, 1997

[87] PCT Pub. No.: WO97/02717

PCT Pub. Date: Jan. 23, 1997

[30] Foreign Application Priority Data

Jun. 30, 1995 [DE] Germany ......................... 195 24 024.3

[51] Int. Cl.$^6$ ..................................................... G06F 17/00
[52] U.S. Cl. ...................................... 395/838; 395/200.51
[58] Field of Search ............................... 395/838, 200.51, 395/200.52, 200.55, 200.32, 651, 652, 712; 340/825.08

[56] References Cited

U.S. PATENT DOCUMENTS 4,750,136  6/1988  Arpin ..................................... 395/838

FOREIGN PATENT DOCUMENTS

| 0 229 378 A2 | 7/1987 | European Pat. Off. . |
| 0 398 129 A2 | 11/1990 | European Pat. Off. . |
| 41 00 198 A1 | 7/1991 | Germany . |
| 2 202 062 | 9/1988 | United Kingdom . |

OTHER PUBLICATIONS

IEEE Journal on Selected Areas in Communications, SAC–3, (1985) Jul., No. 4, New York, USA, "The Harris 20–20 Integrated Network Switch", Jackson et al.

Primary Examiner—Ellis B. Ramirez
Attorney, Agent, or Firm—Hill & Simpson

[57] ABSTRACT

The circuit-oriented components of at least one function area of a communication system are combined on at least one area module. For a configuration of the communication system, a combination—determined by the central controller and stored in this controller—of a circuit technology identification and at least one function identification is transmitted to the respective area module and is stored there in the sense of a specification of the circuit-oriented and procedural functions of the area module. At least one program module allocated to the combination of a circuit technology identification and at least one function identification is transmitted to the respective area module, using the central controller, and is stored in this controller. One essential advantage of the inventive method is that the multiplicity of greatly varying modules is considerably reduced, and a considerable reduction of the economic outlay in the manufacture, testing and warehousing of modules for a communication system is thus achieved.

8 Claims, 2 Drawing Sheets

METHOD OF SPECIFYING MULTIFUNCTIONAL SUBASSEMBLIES IN A COMMUNICATION SYSTEM

This application is a 371 of PCT/DE96/01131 filed on Jun. 20, 1996.

BACKGROUND OF THE INVENTION

1. Field of the Invention

The present invention relates generally to the field of telecommunications, and, more particularly, the present invention relates to the use of process controlled modules in a communication system.

2. Description of the Related Art

Communication systems, in particular private and public switching installations, contain predominantly program-controlled modules that are constructed in different ways with respect to circuitry and programming, depending on the configuration of the communication system and on the greatly varying signalings and transmission methods used in the communication networks. A communication system with a module design of this type is known for example from the reference "ISDN in the office, HICOM", pp. 56 to 64 in particular, 1985, Siemens. Each of the modules, e.g. the signaling unit or the trunk modules, is hereby equipped with a control unit, i.e. a microprocessor, and the required circuit-oriented components, such as e.g. subscriber terminal interfaces or interfaces for the internal communication exchange exchange. These are respectively arranged on the modules. The greatly varying circuit-oriented and program-oriented realizations of the modules provided for this purpose mean that a multiplicity of different modules must be provided for a communication system, which increases further due to further circuit-oriented and program-oriented developments of the modules. The multiplicity required is connected with an increased economic expense or, respectively, with increased costs in manufacturing (greatly varying equipment variants), in testing (a multiplicity of test programs) and in warehousing (outlay of space and management) of the modules.

SUMMARY OF THE INVENTION

One underlying object of the present invention is to reduce the economic expense caused by the multiplicity of modules.

Another aspect of the inventive method is that the circuit-oriented and procedural functions of a functional area of a communication system, i.e. of an area with similar functions, are combined on one area module. For example, an area module represents a signaling module allocated to central control, on which module all circuit-oriented components are combined that are required for the processing of all signaling procedures provided in the communication system. The circuit-oriented and procedural functions that can be realized by the area modules—in relation to the signaling module, the possible signalings and the variants thereof—are specified, i.e. determined, by the combination of a circuit technology identification and at least one function identification. In addition, at least one program module is allocated to each of the combinations [sic] of circuit technology identifications and function identifications. The program module is a computer program which realizes, the procedural function or, respectively, the procedural functions of the function or, respectively, functions determined by the combination of the identifications. In addition, by means of the at least one program module circuit-oriented settings—e.g. switching active or inactive—of the circuit-oriented components can be effected by correspondingly inserted items of information. The at least one program module can be stored in the communication system itself (e.g., hard disk, streamer CD-ROM), in a memory placed at the disposal of the communication system (e.g., CD-ROM), or in a service center in the respective communication network. This can respectively be transmitted from there to the area module, using the central control.

Given a configuration of the communication system, e.g. during commissioning or during this change of the configuration of the communication system, a combination—determined by the central control unit—of a circuit technology identification and at least one functional identification is transmitted to the area module to be set up, and is stored in this module. By storing the combination of the two identifications, the respective area module is specified, i.e. the desired circuit-oriented and procedural functions are unambiguously selected or, respectively, defined from all possible ones. Subsequently, using the central control unit of the communication system, the allocated at least one program module is transmitted to the respective area module and is stored there. One advantage of the inventive method is that by means of the combination of the circuit-oriented components of at least one functional area on an area module and the function selection or, respectively, specification of this area module by means of a combination of a circuit technology identification and at least one function identification, the multiplicity of greatly varying modules is considerably reduced, and a considerable reduction of the economic outlay in the manufacture, testing and warehousing of modules for a communication system is achieved. A further advantage of the inventive method is that, for a change of the configuration of the communication system, the circuit and procedural characteristics of an area module are achieved without having to exchange a module. This is done by a reconfiguration of the area module by transmitting and storing a modified circuit technology identification and at least one function identification and the transmission of other program modules from the central control unit. In this manner, expensive measures for procurement, warehousing and waste disposal are avoided.

After setting up the respective area module, this module is set into operation using the central controller, and is included in the functional sequence of the communication system. Given the transmission of several program modules, these are set into operation one after the other using the central controller, and are included in the functional sequence.

In the central controller, the configuration of the respective communication system is advantageously administrated in a configuration table, whereby a predetermined combination of a circuit technology identification and at least one function identification is entered in the configuration table for the area modules to be configured. The combination of a circuit technology identifier and at least one function identifier is determined by the respective network operator and is entered in the configuration table in a manner controlled by the user interface. In the signaling area module indicated as an example, the combination of the circuit technology identification and at least one function identification is determined by the signalings, or, respectively, signaling protocols, to be processed in the respective communication system, and the occurrences thereof.

The circuit technology identification is advantageously represented by an item of area module type information that indicates the essential function of the respective area module. For example, this may be the type information "signaling area module." Alternatively, abbreviations for the respective items of type information are advantageous.

According to a further embodiment of the inventive method, the function identification is numeric information. This may designate function information indicating the subfunctionality of the at least one program module to be loaded, and a program identification identifying the at least one program module to be loaded. By means of this combination of items of information, an unambiguous allocation of an at least one program module realizing the procedural functions is given to the respective area modules. The program identification is, for example, represented by the program name of the respective program module. The function information is formed, for example, by an item of information that defines a signaling protocol, such as at the communication system side or at the communication terminal apparatus side.

According to a further advantageous construction of the inventive method, the circuit technology identification and the at least one function identification in the area module is stored in a non-volatile memory that is electrically erasable and programmable. By this means, a restart-secure storing of the circuit technology identification and of the at least one function identification is achieved. For example, they do not have to be reloaded given a restart caused by a hardware or software error.

In addition, an item of type information indicating the type of the area module is stored in the non-volatile, electrically erasable and programmable memory. This item of information is for example stored in the memory during the manufacture of an area module, and is read by the central control unit upon the setting up of a module, in the sense of the recognition of the type of the plugged-in area module.

Further advantageous constructions of the inventive method can be learned from the further claims.

In the following, the inventive method is explained in more detail on the basis of a block switching diagram and a flow diagram.

DETAILED DESCRIPTION OF THE PRESENTLY PREFERRED EMBODIMENTS

Figure 1:
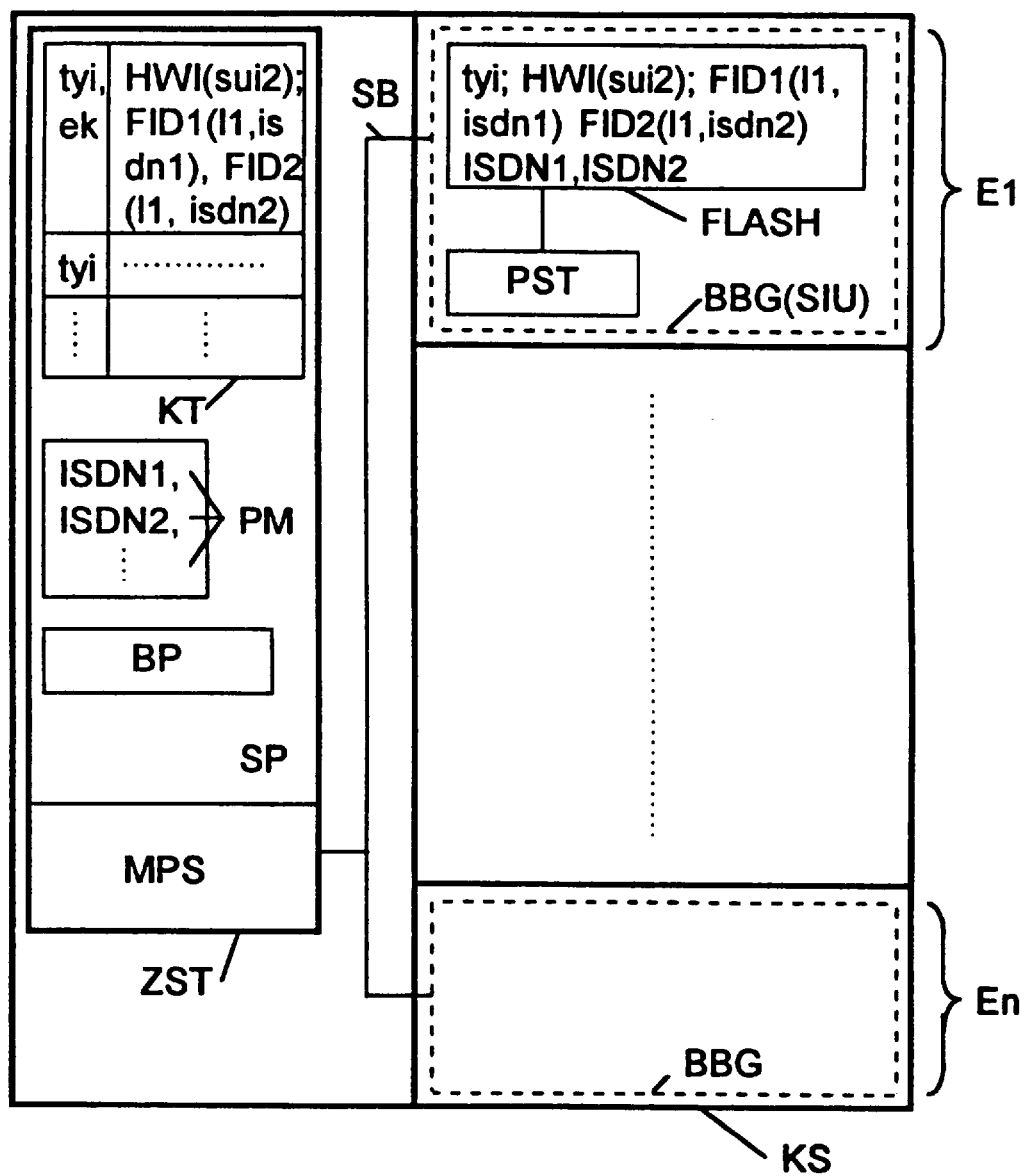
FIG. 1 illustrates a block switching diagram wherein a communication system provided which employs the inventive method.

FIG. 1 illustrates a communication system KS in which a central control unit ZST, as well as several installation locations E1 . . . n for area modules BBG, are provided. Dependent on the provided configuration of the communication system KS, area modules BBG are plugged into these installation locations E1 . . . n, which are equipped with plugging means (not shown).

For the explanation of the inventive method, an area module BBG is shown in broken lines as an example at the first installation location E1. This area module, and further area modules BBG, are connected in parallel with the central control unit ZST via a system bus SB. Alternatively, individual connections with a serial transmission of information are possible (not shown). The central controller ZST is formed by a microprocessor system MPS and a memory SP, whereby the memory SP can be an integral component of the microprocessor system. Let it be assumed for the exemplary embodiment that the area modules BBG can be plugged in at arbitrary installation locations E1 . . . n. Alternatively, limitations in the allocation of installation locations E1 . . . n to the various types of area modules BBG are possible. For example different types of area modules BBG must be plugged at determined installation locations.

Each area module BBG contains all the circuit-oriented components that are required for the realization of a function area of a communication system KS. The respective function area hereby preferably comprises similar functions, e.g. all the signaling functions. For the exemplary embodiment, it is assumed for the sake of example that all circuit-oriented components required for realization of all signalings possible in the respective communication system KS are arranged on an area module SIU. Possible signalings, are for example, are different analog or digital intermediate exchange signaling methods for different countries. In the exemplary embodiment, the circuit components are in particular different constructions of the microprocessor systems required for the realization of the respective signaling protocol. In area modules BBG, which are for example related to the subscriber terminal region (not shown), a great variety of circuit-oriented components, in particular with respect to the different subscriber terminal technology or, respectively, subscriber transmission technology, are combined on an area module BBG or, respectively, several area modules BBG (e.g., analog, digital).

Each of the area modules BBG contains, for its controlling or, respectively, for its operation, a peripheral controller PST, which is preferably realized by a microprocessor system. This peripheral controller PST contains, besides the usual storage units (not shown), a non-volatile, electrically erasable and programmable memory FLASH, into which an item of type information tyi was programmed, for example during the manufacture of the area module BBG. By means of this type information tyi, the type of the area module BBG is determined; in relation to the exemplary embodiment, the type information is SIU for the signaling area module SIU. If, for example, two signaling area modules are provided, the type information tyi is determined for example by SIU1 and SIU2. Similarly, the type information tyi is to be formed for, e.g., subscriber terminal area modules.

In the memory SP of the central controller, besides the programs BP provided for the switching, operation and maintenance of the communication system KS, a configuration table KT is stored, in which the configuration of the communication system KS is determined. The determination of the configuration of the communication system KS takes place by means of the operator of a communication system KS, whereby the configuration table KT resulting from the determination is administered by operating and maintenance inputs in the memory SP. For each area module BBG that is to be plugged into the communication system KS on the basis of the determined configuration, the configuration table KT contains a corresponding item of type information tyi. A circuit technology identification and at least one function identification HWI,FID1 . . . n is allocated to this item of type information tyi. In relation to the exemplary embodiment, the circuit technology identification HWI is for example determined by the item of area module type information siu2, whereby a circuit-oriented setting of an area module BBG is defined for example by means of the numeric item of information. By means of the transmission of this circuit technology identification HWI to the allocated area module BBG, in this module the circuit-oriented components provided for the realization of a determined signaling are switched active or, respectively, inactive, or the circuit components present are set to predetermined modes of operation, e.g. coder and decoder.

Figure 2:
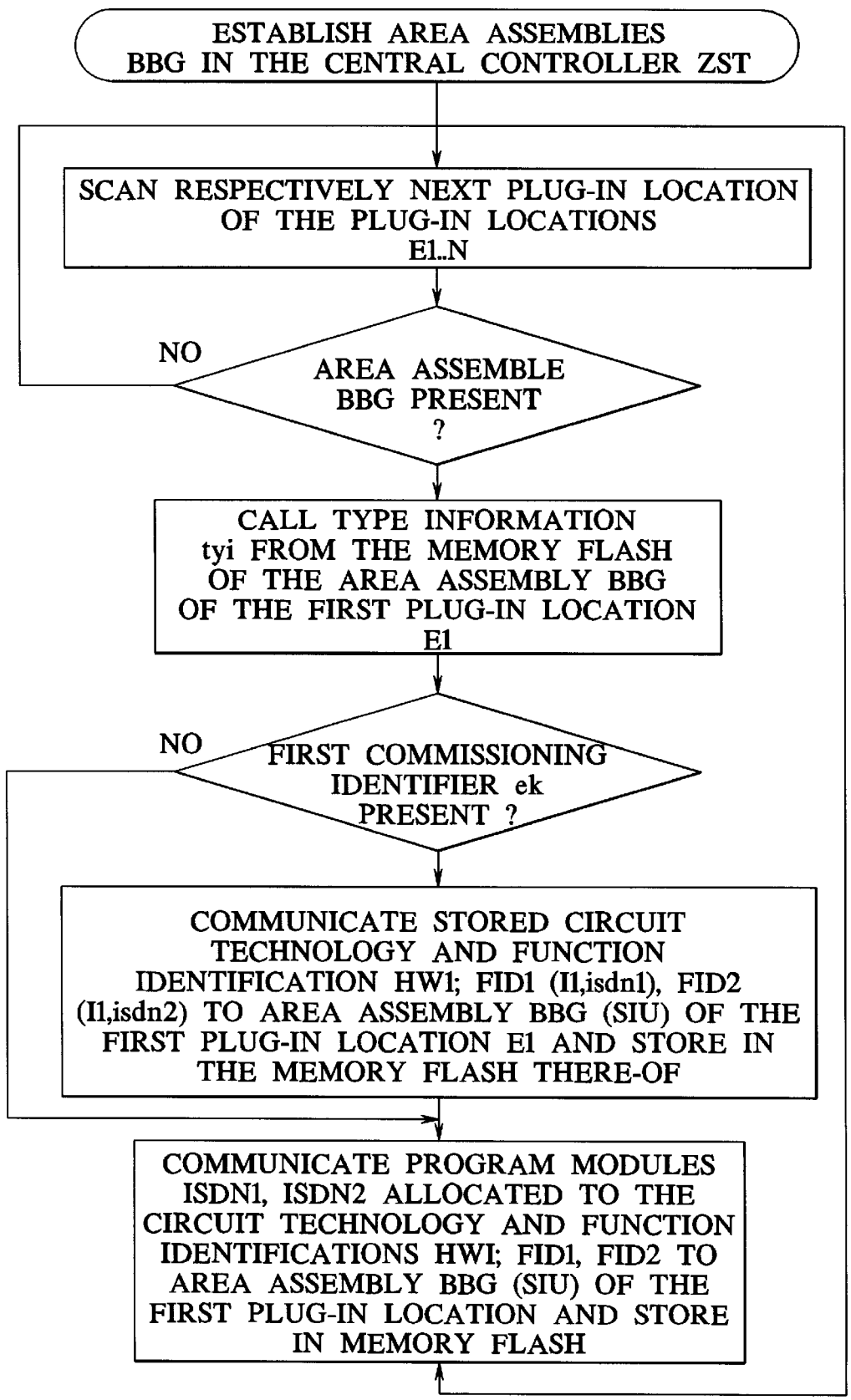
FIG. 2 illustrates, in a flow diagram of the setting up of an area module.

The at least one function identification FID is respectively formed by numeric item of information FID1,2, an function information 11,2 indicating subfunctions, and by a program identification isdn1,2 indicating the program module ISDN1,2 to be loaded. For the exemplary embodiment, two function identifications FID1,2 are assumed. However, several function identifications FID (e.g., four) are possible. After a transmission of the function identifications FID1,2 to the respective area module BBG, the respective area module BBG is unambiguously specified or, respectively, defined— together with the circuit technology identification HWI— with respect to its circuit-oriented settings and the functions to be realized. Subsequently, the program modules ISDN1,2 that are indicated in the function identifications FID1,2 and stored in the memory SP of the central control unit ZST are transmitted to the respective area module BBG, and— together with the circuit technology identification and the at least one function identification HWI,FID1,2—are stored in the non-volatile, electrically erasable and programmable memory FLASH. The sequence with respect to the transmission and storing of the circuit technology identification and of the at least one function identification HWI,FID1,2, as well as of the program modules ISDN1,2, is shown in FIG. 2 in the self-explanatory flow diagram. In the flow diagram, a first commissioning identifier ek is indicated to distinguish a first commissioning or a modification of the area modules or, respectively, of the communication system. This first commissioning identifier ek is for example formed using the central controller ZST, and is entered in the configuration table KT upon commissioning. After the first commissioning, the identifier ek is erased.

The non-volatile, electrically erasable and programmable memory FLASH on the area modules BBG can alternatively be replaced by an EPROM for the storing of the item of type information tyi and by a ROM for storing the program modules IDSN1,2, whereby however a new loading of the program modules ISDN1,2 is required according to the inventive method upon each restart of the communication system KS or of the respective area module BBG.

The inventive method is advantageously also used together with the known modules, i.e. in mixed operation. However, for the circuit technology identification HWI, an item of area module type information siu is hereby to be used, as was also previously used for the identification of the modules, and only one numeric item of information 0 is allocated to the function identification FID. By means of the numeric item of information 0 it is indicated that no area module BBG is present. The selection and loading of the program modules is carried out corresponding to the known methods.

What is claimed is:

1. A method for specifying functions of processor-controlled modules of a communication system in a communication network, said system being equipped with a central control unit, the method comprising:

combining circuit-oriented components of at least one function area on at least one area module;

specifying possible circuit-oriented and procedural functions of an area module by a combination of a circuit technology identification and at least one function identification;

allocating at least one program module to each combination of a circuit technology identification and at least one function identification and storing the module in the communication network;

transmitting a combination of a circuit technology identification and at least one function identification to the respective area module and storing it as a specification of the functions of the area module;

transmitting at least one allocated program module to the respective area module using the central controller, and storing program module in this controller.

2. A method according to claim 1, further comprising:

after the transmission of the at least one program module to the respective area module, setting this area module into operation with the central controller, and including it in the functional sequence of the communication system.

3. A method according to claim 1 wherein the central control unit has a configuration table having a circuit technology identification and at least one function identification for the configured area modules.

4. A method according to claim 1, wherein the circuit technology identification is represented by area module type information that indicates functions in the communication system.

5. A method according to claim 1, wherein the function identifications are comprised of:

numeric information and function information indicating the subfunctionality of the at least one program module to be loaded; and a program identification identifying the at least one program module to be loaded.

6. A method according to claim 1, further comprising:

storing the circuit technology identification and the at least one function identification in the area module in a non-volatile, electrically erasable and programmable memory.

7. A method according to claim 1, further comprising storing type information indicating the type of the area module in an area module in a non-volatile, electrically erasable and programmable memory.

8. A method according claim 1, wherein a configuration of the communication system represents a first commissioning of an area module or a modification of the configuration of the communication system, whereby the first commissioning of an area module is indicated by means of a first commissioning identifier, using the central controller.

* * * * *